Sept. 11, 1962    L. SCHEMITSCH    3,053,292
MORTISING JIG
Filed April 21, 1960    2 Sheets-Sheet 1
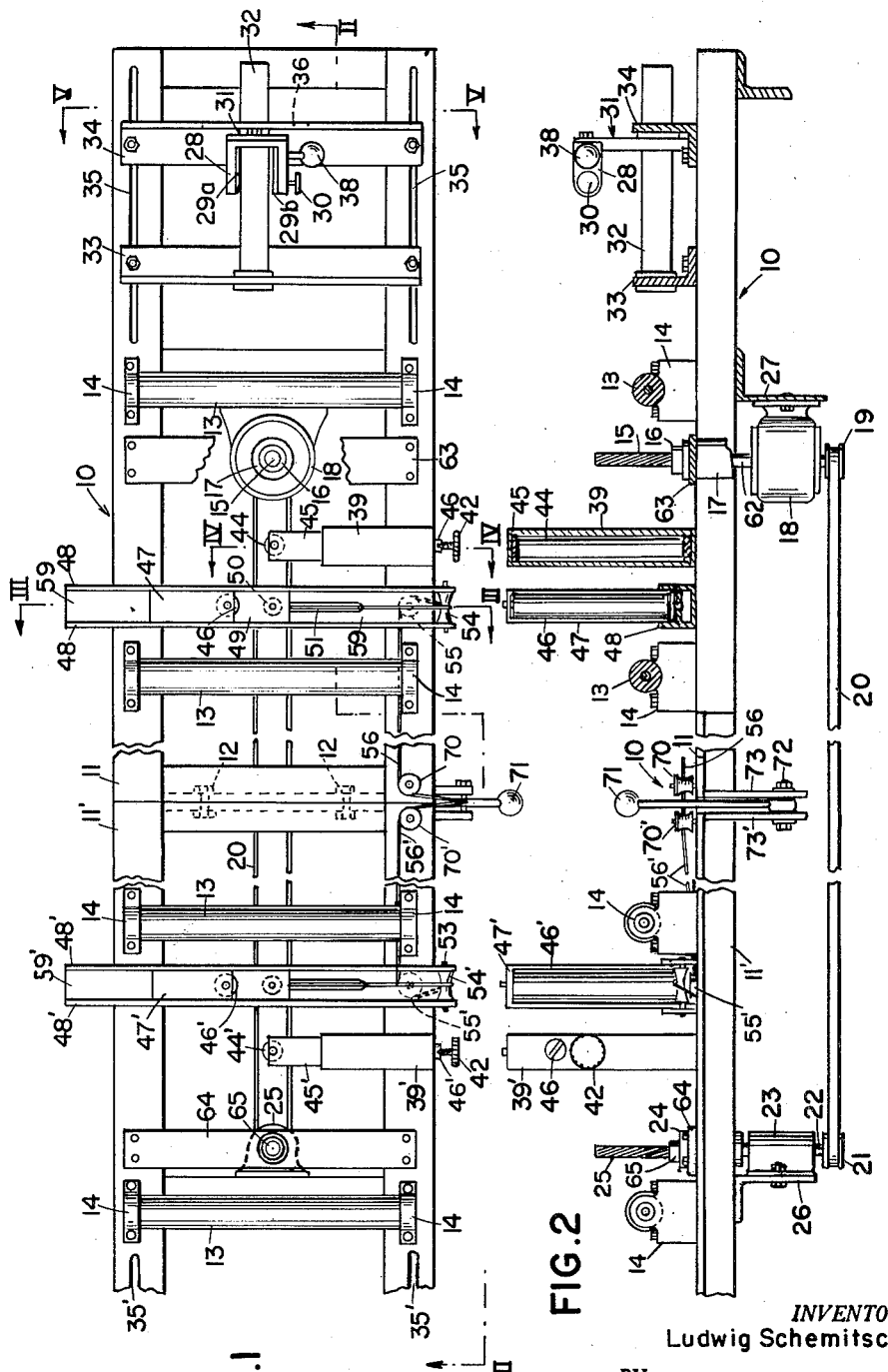
INVENTOR:
Ludwig Schemitsch
BY
Karl F. Ross
AGENT.

Sept. 11, 1962 L. SCHEMITSCH 3,053,292
MORTISING JIG
Filed April 21, 1960 2 Sheets-Sheet 2
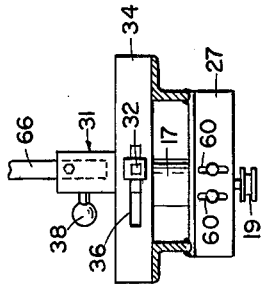
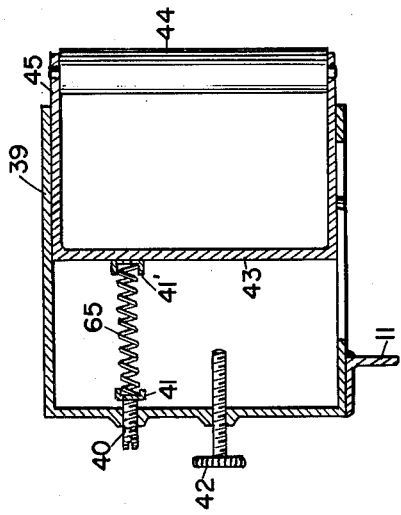
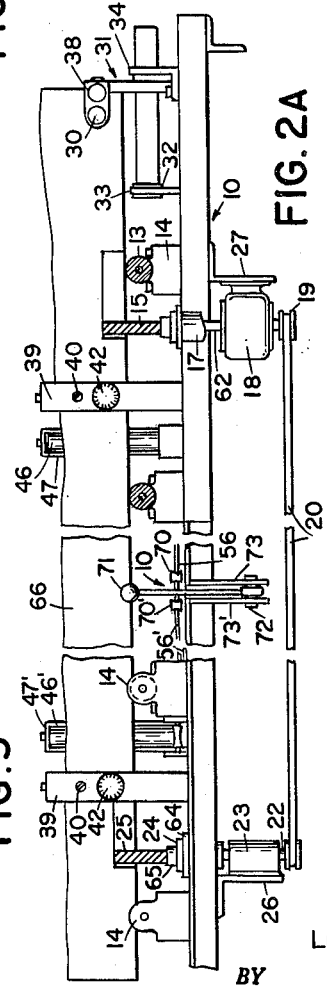
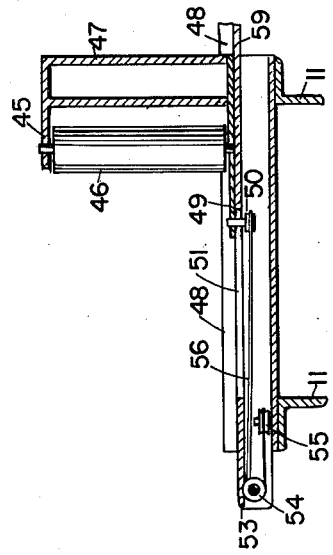
INVENTOR:
Ludwig Schemitsch
BY
AGENT.

3,053,292
Patented Sept. 11, 1962

3,053,292
MORTISING JIG
Ludwig Schemitsch, 61—42 Madison St., Brooklyn, N.Y.
Filed Apr. 21, 1960, Ser. No. 23,836
7 Claims. (Cl. 144—27)

My present invention relates to a mortising jig and, more particularly, to a jig adapted to facilitate the rabbeting of doors, door jambs and the like to receive the leaves of butt hinges.

It is an object of my invention to provide an improved apparatus for positively guiding a door, or some other large, unwieldy article to be mortised, in a manner accurately and reproduceably determining both the length and the depth of a cut to be formed therein without requiring the use of templates positioned to guide a router or other tool by direct contact.

According to a feature of my invention, a door, door jamb or similar workpiece is urged against one or more mortising routers in a direction perpendicular to the plane of the object while being reciprocated in a direction generally parallel to said plane. The workpiece rests on a suitable support, such as a set of horizontal rollers, with the edge to be rabbeted while being gripped in the desired (generally upright) working position between three or more upstanding rollers which engage the workpiece on opposite sides and are jointly displaceable, preferably against an opposing spring force, in a transverse direction toward the routing tool or tools to an extent limited by an advantageously adjustable stop. The gripping roller or rollers positioned on the tool side may have their shafts spring-loaded to resist such displacement whereas the roller or rollers on the opposite side may be provided with shaft-engaging links operable by manual or automatic means to advance the workpiece against the spring force. The workpiece may be clamped by a reciprocating harness adapted to displace it longitudinally, relatively to the routing heads, between the upstanding gripping rollers.

The above and other objects, features and advantages of the present invention will become more readily apparent from the following specific description, reference being made to the accompanying drawing in which:

FIG. 1 is a top-plan view of a mortising jig according to the invention;

FIG. 2 is an elevational cross-sectional view taken along line II—II of FIG. 1;

FIG. 2A is a side-elevational view of the jig;

FIG. 3 is a cross-sectional view taken along line III—III of FIG. 1;

FIG. 4 is a cross-sectional view taken along line IV—IV of FIG. 1;

FIG. 5 is a cross-sectional view taken along line V—V of FIG. 1;

FIG. 6 is a diagrammatic view of a mortising jig according to another embodiment of the invention; and FIG. 7 is a view similar to FIG. 6 of still another embodiment.

In FIGS. 1 to 5 of the drawing I show a bipartite table 10 whose halves consist of angle-iron frames 11, 11' bolted together at 12; a plurality of horizontal supporting rollers 13 are journaled in pillow boxes 14 mounted along the longitudinal edges of the table. A router 15 is removably received in a chuck 16 whose shaft 62 is journaled in a bearing 17, the latter traversing with freedom of vertical adjustment a cross-plate 63 carried by the table half 11. Shaft 62 is also the armature shaft of a motor 18 and carries a pulley 19 which is linked by a V-belt 20 with a similar pulley 21 whose shaft 22 is journaled in a pillow block 23 underneath table half 11'. Shaft 22 is journaled in a bearing 24 which, like bearing 17, passes with freedom of vertical adjustment through a transverse plate 64, and is provided with a chuck 65 within which a router 25 is removably secured. The pillow block 23 and the motor 18 are mounted upon a pair of crossbars 26 and 27, respectively. These crossbars are provided with vertically disposed elongated channels 60 (illustrated in FIG. 5) dimensioned to receive the mounting bolts, whereby the routers 25 and 15 may be raised and lowered relatively to the table 10 merely by loosening the appropriate mounting bolts and displacing the pillow block 23 and/or the motor 18 in a vertical direction. The routers project above the rollers 13 which carry the workpiece at a predetermined height corresponding to the depth of the recess is to be milled in its lower edge.

At the right-hand end of the apparatus I provide a workpiece-guiding assembly comprising a pair of transverse supports 33 and 34 whose mounting bolts pass through a pair of slots 35 along the edges of the table half 11. Supports 33 and 34 carry a rod 32 of square or rectangular cross-section upon which a clamp 31 is slidably displaceable. The clamp 31 comprises a U-shaped frame 28 whose arms are spaced to receive an edge of a door or similar workpiece and are provided with jaws 29a, 29b, the latter being movable by means of a clamp screw 30 threaded into the frame 28 so that the workpiece may be securely harnessed in the assembly. Frame 28 is also provided with a knob 38 to facilitate the manual sliding displacement of clamp 31, and the workpiece engaged thereby, longitudinally along the table rollers 13. Rod 32, however, is mounted in slots 36 (FIG. 5) provided in supports 33 and 34 to enable the rod and the clamp 31 carried thereby to be displaced transversely to the direction of displacement. The supports may be displaced relatively to each other, and to the table 10, upon a loosening of the mounting bolts by longitudinally shifting one or both supports along the slots 35 of table half 11. The supports 33 and 34 thus act as adjustable stops for the reciprocating travel of clamp 31 and the workpiece and, therefore, determine the length of the mortising cut.

Spaced along the table 10 are a pair of upstanding gripping rollers 44, 44' which are journaled in brackets 45, 45' adapted to telescope within housings 39, 39'. A coil spring 65 is secured to the back plate 43 of each bracket 45, 45' and bears upon a cup 41 secured to a compression screw 40. Screw 40 serves to adjust the resisting force of spring 65. An adjustable screw stop 42 for the bracket 45, 45' is threadedly received in the housing 39, 39'. Another pair of vertically disposed rollers 46, 46' are journaled in two longitudinally spaced brackets 47, 47' displaceable in a direction transverse to the table 10; these brackets slide between rails 48, 48' upon hollow bedplates 59, 59' which extend transversely to the table 10 and are secured thereto. Each bracket 47, 47' is provided with a tongue 49 having a pin 50 projecting through a slot 51 provided in the bedplate 59. A flexible member such as a cord 56, 56' is fastened to the pin 50 of each bracket 47, 47' and passes about a horizontal pulley 54, 54' journaled in a pair of ears 53 projecting from the baseplate 59 or 59'. The cords 56, 56' pass over vertically journaled pulleys 55, 55' in each bedplate. From pulleys 55, 55' the cords 56, 56' run along the table 10 toward the junction of the two halves 11, 11' thereof. Each half 11, 11' is provided with a guide pulley 70, 70' and an ear 73, 73' through which a bolt 72 is passed. A manually displaceable lever 71 is pivoted on the bolt 72 between the ears 73, 73', both of the cords 56, 56' being joined to the lever after passing around the respective guide pulleys 70, 70'.

In operation, a door 66 is placed with its edge to be mortised upon the rollers 13 of table 10 and positioned between the two sets of rollers 44, 44' and 46, 46'. The door 66 is then fastened between the jaws 29a, 29b of clamp 31 by a tightening of the screw 30. The following adjustments are made to determine the size of the recesses to be mortised in the lower edge of door 66. The spacing between supports 33 and 34 of the door-guiding assembly is set to the desired recess length while the width of the recess is determined by vertically displacing the routers 15 and 25, as previously described, in relation to the bottom edge of the door. The depth of the mortise may be adjusted with the aid of screw stop 42 which may be calibrated directly in the desired units of measurement. The routers 15 and 25 are rotated by motor 18 and the door 66 is brought into engagement with the routers by an angular displacement of lever 71 to draw rollers 46, 46', via cords 56, 56', against the door 66 and the rollers 44, 44' which yieldably resist the transverse motion thereof. The gradual advance of the rollers 44, 44' against the springs 65 prevents binding as the tools engage the door 66. Simultaneously, the door 66 is displaced longitudinally within the limits of supports 33 and 34 by a manual sliding of clamp 31 along the rod 32 to produce a cut of the desired size. Advantageously, the rollers 46 may be drawn against the door 66 with the left hand while the right hand is used to reciprocate the workpiece. It will be apparent, however, that although a simple manually operated device is illustrated, the progressive displacement of rollers 46, 46' and/or the sliding motion of clamp 31 may be automatically derived from a suitable power source (e.g. motor 18).

For left-handed operators, a pair of slots 35' are provided in table half 11', whereby the door-guiding assembly 31–34 may be adjustably positioned at the left end of the device. In this case the lever 71 is operated by the right hand while the door is reciprocated by the left one.

Since the device illustrated may be separated at the junction of halves 11, 11' into two relatively light and compact portions, the mortising jig is readily portable and suitable for "on-the-job" operations.

In FIG. 6 I illustrate diagrammatically a modification of the invention wherein two rollers 75, 75' have their shafts spring-loaded to resist the forward advance of the door 66, shown in dot-dash lines, and the single, centered roller 76 whose shaft is manually displaceable as described above with reference to the rollers 46, 46'. This construction dispenses with one of the two pressure rollers of the preceding embodiment. Similarly, in FIG. 7 I show another modification of the invention wherein only one centrally positioned spring-loaded roller 75 and two manually displaceable pressure rollers 76, 76' are provided to bear upon the door 66.

The invention as illustrated and described is believed to admit of many modifications and variations readily apparent to persons skilled in the art and intended to be included within the spirit and scope of the invention, except as further limited by the appended claims.

I claim:

1. A device for mortising an elongated object, comprising a support for said object, gripping means above said support adapted to engage said object with freedom of longitudinal movement of the latter along said support, mounting means for said gripping means, said gripping means being held by said mounting means for displacement transverse to the path of said movement along with the object engaged, tool means positioned above said support on one side of said path for progressively cutting into said object upon transverse movement of said gripping means in a direction toward said tool means, operating means for imparting said transverse movement to said gripping means concurrently with longitudinal movement of said object in said gripping means, and abutment means for arresting said gripping means in a position corresponding to a predetermined depth of cut for said tool means on said object.

2. A device for mortising an elongated object, comprising a support for said object, gripping means above said support adapted to engage said object with freedom of longitudinal movement of the latter along said support, mounting means for said gripping means, said gripping means being held by said mounting means for displacement transverse to the path of said movement along with the object engaged, tool means positioned above said support on one side of said path for progressively cutting into said object upon transverse movement of said gripping means in a direction toward said tool means, harness means adapted to be clamped to said object, transversely displaceable guide means slidably supporting said harness means, operating means for imparting said transverse movement to said gripping means concurrently with a similar movement of said guide means and longitudinal movement of said object in said gripping means, and abutment means for arresting said gripping means in a position corresponding to a predetermined depth of cut for said tool means on said object.

3. A device according to claim 2, further comprising stop means on said guide means engageable with said harness means for limiting the longitudinal movement of said object.

4. A device for mortising an elongated object, comprising a table provided with supporting means for said object enabling longitudinal movement thereof above said table, tool means on said table rising above said supporting means for engagement with one side of the moving object, first upstanding roller means on said table positioned for rotatable engagement with said one side of said object, second upstanding roller means on said table positioned for rotatable engagement with the opposite side of said object, first and second mounting means on said table respectively having said first and second roller means journaled therein for transverse movement relative to the direction of said longitudinal movement, operating means engaging said second roller means for urging the latter along with said object against said first roller means and said tool means concurrently with longitudinal movement of said object between said first and second roller means, spring means on said first mounting means opposing transverse displacement of said first roller means by said operating means, and abutment means adapted to arrest said first roller means in a position corresponding to a predetermined depth of cut for said tool means on said object.

5. A device for mortising an elongated object, comprising a table provided with supporting means for said object enabling longitudinal movement thereof above said table, tool means on said table rising above said supporting means for engagement with one side of the moving object, first upstanding roller means on said table positioned for rotatable engagement with said one side of said object, second upstanding roller means on said table positioned for rotatable engagement with the opposite side of said object, first and second mounting means on said table respectively having said first and second roller means journaled therein for transverse movement relative movement relative to the direction of said longitudinal movement, operating means engaging said second roller means for urging the latter along with said object against said first roller means and said tool means, harness means adapted to be clamped to an extremity of said object, transversely displaceable guide means at one end of said table slidably engaged by said harness means whereby said object may be longitudinally moved between said first and second roller means through the intermediary of said harness means while being transversely displaced under the urging of said operating means, stop means on said guide means engageable with said harness means for limiting the longitudinal movement of said object, spring means on said first mounting means opposing transverse displacement of said first roller means by said operating means, and abutment means on said first mounting means adapted to arrest said first roller means in a position corresponding to a predetermined depth of cut for said tool means on said object.

6. A device according to claim 5 wherein said table is divided into two substantially identical portions detachably interconnected near the midpoint of the path of longitudinal movement of said object, each of said upstanding roller means comprising a roller on each of said portions.

7. A device according to claim 6 wherein said tool means comprises a router head on each of said portions.

References Cited in the file of this patent

UNITED STATES PATENTS

| | | |
|---|---|---|
| 99,600 | Schenck | Feb. 8, 1870 |
| 657,666 | Melby | Sept. 11, 1900 |
| 696,255 | Neville | Mar. 25, 1902 |
| 724,966 | Striebel | Apr. 7, 1903 |
| 1,857,783 | Hunter | May 10, 1932 |
| 2,339,727 | Taylor | Jan. 18, 1944 |
| 2,638,133 | Trapeur | May 12, 1953 |
| 2,839,104 | Stiefel | June 17, 1958 |
| 2,945,520 | Grubb | July 19, 1960 |

FOREIGN PATENTS

| | | |
|---|---|---|
| 516,584 | Germany | Jan. 24, 1931 |
| 800,017 | Germany | Aug. 4, 1950 |